United States Patent [19]

Eng et al.

[11] Patent Number: 5,146,396
[45] Date of Patent: Sep. 8, 1992

[54] SINGLE STAGE POWER FACTOR CORRECTED CONVERTER HAVING ISOLATED OUTPUT

[75] Inventors: Wing K. Eng, Dallas; William F. Slack, Garland, both of Tex.

[73] Assignee: AT&T Bell Laboratories, Murray Hill, N.J.

[21] Appl. No.: 716,464

[22] Filed: Jun. 17, 1991

[51] Int. Cl.⁵ .......................................... H02M 3/335
[52] U.S. Cl. ...................................... 363/16; 363/37; 363/40; 363/97; 323/207
[58] Field of Search .................. 323/205, 207; 363/15, 363/16, 37, 39, 40, 41, 97, 131

[56] References Cited

U.S. PATENT DOCUMENTS

| | | | |
|---|---|---|---|
| 4,184,197 | 1/1980 | Cuk et al. | 363/40 |
| 4,384,321 | 5/1983 | Rippel | 363/124 |
| 4,403,269 | 9/1983 | Carroll | 363/131 |
| 4,594,649 | 6/1986 | Rhoads et al. | 363/131 |
| 4,618,919 | 10/1986 | Martin | 363/16 |
| 4,736,284 | 4/1988 | Yamagishi et al. | 363/97 |
| 4,754,385 | 6/1988 | McDade et al. | 363/16 |
| 4,868,730 | 9/1989 | Ward | 363/16 |
| 4,870,553 | 9/1989 | Brown | 363/16 |
| 4,975,819 | 12/1990 | Lannuzel | 363/97 |
| 5,047,911 | 9/1991 | Sperzel et al. | 363/97 |

FOREIGN PATENT DOCUMENTS 0215970 12/1983 Japan .

OTHER PUBLICATIONS

"High Power Factor Preregulators for Off–Line Power Supplies" by Lloyd Dixon, p. 7-1, Jun. 10, 1991.
"High Power Factor Switching Preregulator Design Optimization" by Lloyd Dixon, pp. 12-1, 12-8, 12-9, 12-10 (incomplete), Jun. 10, 1991.

*Primary Examiner*—Steven L. Stephan
*Assistant Examiner*—Jeffrey Sterrett
*Attorney, Agent, or Firm*—A. G. Steinmetz

[57] ABSTRACT

A power converter is operative to reduce harmonics at an AC input by controlling its power switching so that a current waveform in a switched inductor is substantially identical to a rectified version of the input AC voltage waveform. The voltage spikes induced by the switching of the inductor into circuitry that includes the leakage inductance of a power transformer are subdued by circuitry that absorbs the initial voltage spike temporarily and then delivers that energy to the output load of the converter.

9 Claims, 3 Drawing Sheets

SINGLE STAGE POWER FACTOR CORRECTED CONVERTER HAVING ISOLATED OUTPUT

FIELD OF THE INVENTION

This invention relates to switching power converters and, in particular, to switching power converters having an input rectifier connected to an AC line source of energy and to arrangements to limit the generation of harmonics at the AC input.

BACKGROUND OF THE INVENTION

Switching power converters powered directly off of an AC power line are commonly designated as off line switchers (OLS). These converters rectify the AC voltage of the line and store it as a unipolar voltage on a voltage storage capacitor. This unipolar voltage, stored on the voltage storage capacitor, is applied to subsequent power switching circuitry for DC to DC power processing.

The input impedance characteristics of an OLS are largely defined by its input rectifier and voltage storage capacitor. The voltage retention and the current sink characteristics of the voltage storage capacitor combine to make the line current conduction time of the rectifiers to be highly peaked and much shorter in duration than the half cycle duration of the input AC voltage waveform. Since the current waveforms are distorted from the desired sinusoidal waveforms the actual current waveforms induce a high harmonic content in the input current. These harmonic signals are returned to the input line and cause EMI problems to the supply network. The power factor at the input is significantly degraded, since the real power is extracted only from the waveform portion of the input current which is in phase with the applied voltage waveform.

Filters are often used at the input of the power converter to block the application of harmonics to the AC line. The filter is normally tuned to eliminate the third and fifth harmonics. Many other harmonicas are generated however and hence, passive filters are limited in their ability to achieve very high power factors. Boost converters have also been used as an active filter input stage to reduce the harmonics at the AC input line where improved performance is required. The boost converter switch is modulated so that the line current waveform is maintained essentially at the fundamental frequency of the applied AC input voltage. A power conversion stage usually follows the boost converter and is needed to provide line isolation and regulation of the DC output signal. Thus, often two cascaded converters are required to achieve low harmonics at the input and achieve input output isolation between the AC input and the DC output.

A particular power converter operative off of an AC power line to achieve high power factors and provide isolation between input and output is disclosed in assignees co-pending patent application Ser. No. 07/590,410 filed Sep. 28, 1991 and entitled "Single Conversion Power Factor Correction Using SEPIC Converter" This converter achieves high power factors, and hence, the current inertia characteristics of its energy storage inductor place large voltage stresses on the converter power switches.

SUMMARY OF THE INVENTION

A power converter (OLS) is operative to reduce harmonics at its AC line input by controlling its power switching so that a current waveform in a switched inductor is maintained substantially identical to a waveform of a rectified version of the input AC voltage waveform. In one preferred embodiment of the invention, the voltage spikes induced by the switching of the inductor into a power train circuit that includes the leakage inductance of the power transformer are subdued by circuitry that absorbs the initial voltage spike temporarily and then delivers that energy to the output load of the power converter.

DETAILED DESCRIPTION

Figure 1:
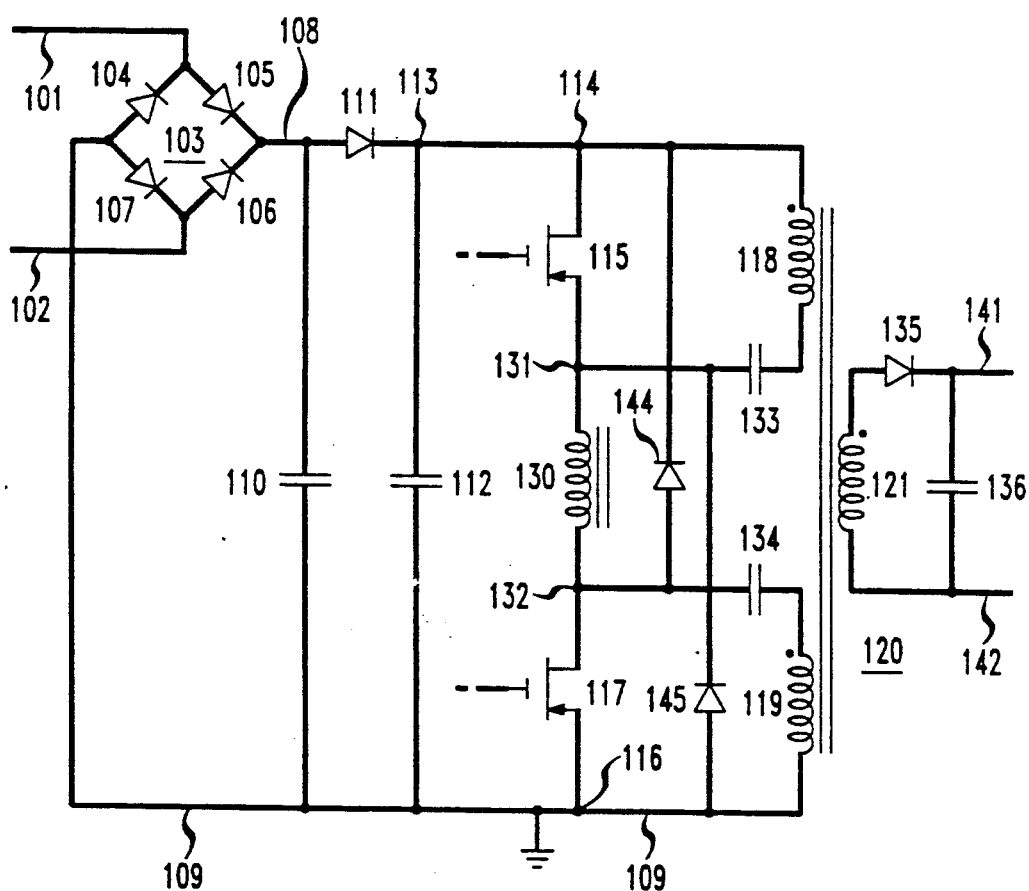
FIG. 1 is a schematic of a power train of a OLS embodying the principles of the invention.

The power train schematic of a power converter (OLS) powered off of an AC line voltage source and having power factor correction capabilities in accord with the principles of the invention is disclosed in FIG. 1. The input terminals 101 and 102 are connected to an AC power line such as is provided by a commercial energy utility. Terminals 101 and 102 are connected to a full-wave rectifier 103 comprising the rectifying diodes 104, 105, 106 and 107. The output leads of the full wave rectifier 108 and 109 are connected to opposite terminals of a high pass filter capacitor 110. High pass filter capacitor 110 is selected to present a low impedance to the high frequency signals due to the switching of the converter's power switches and present a high impedance to signals at the AC power line frequency.

The high pass filter capacitor 110 is connected by the steering diode 111 to a power switching circuit comprising FET power switches 115 and 117, and to a voltage transient sink capacitor 112. Capacitor 112 has a charge acceptance capacity sufficient to sink anticipated transient spike energy due to converter power switching action. This spike energy is induced by distributed circuit loop inductances of the converter and by the power transformer leakage inductances.

A circuit node 113 common to the diode 111 and capacitor 112 is connected to a circuit node 114 of the FET switch 115 and the first primary winding 118 of the power transformer 120. Lead 109 serves as a ground return from a second primary winding 119 of the power transformer 120.

An energy storage inductor 130 is connected between the circuit nodes 131 and 132. Circuit node 131 is common to the FET switch 115 and to a DC blocking capacitor 133, coupling node 131 to the first primary winding 118. Circuit node 132 is common to the FET switch 117 and to a DC blocking capacitor 134 coupling node 132 to the second primary winding 119.

A secondary winding 121 of transformer 120 is coupled, via diode 135, to a capacitor 136 which provides energy storage to smooth the output voltage supplied by the output terminals 141 and 142.

In operation the input AC voltage at terminals 101 and 102 is rectified by the full-wave rectifier 103. This rectified voltage is a unipolar half cycle sinusoid waveform voltage and as such is imposed on the capacitor 110. The voltage waveform across the capacitor 110 is a half sinusoid waveform with the half cycle waveform substantially identical to the half cycle waveform of the input voltage waveform.

The voltage on capacitor 110 is coupled by a diode 111 to the FET power switches 115 and 117 which are switched on and off simultaneously to periodically connect an energy storage inductor 130, connected in series with the two switches 115 and 117, to the voltage storage capacitor 110. A voltage transient sink capacitor 112 shunts the series connection of the two switches 115 and 117 and inductor 130 and is operative to reduce switching stress on switches 115 and 117 as described herein below.

Both the FET switches 115 and 117 are simultaneously switched on and off at a frequency (100 KHZ) substantially higher than the frequency (60 HZ) of the AC line source voltage. When both switches are conducting the voltage of the capacitor 110 is applied to the inductor 130 and electrical energy is stored therein. The charging current flow through the inductor 130 causes a voltage drop therein with the node 131 being positive with respect to the node 132. During the subsequent non-conduction of the two switches 115 and 117, the electrical energy stored in the inductor 130 is applied to the two primary windings 118 and 119 of the power transformer 120. Node 131 is coupled to the primary winding 118, via the DC blocking capacitor 133, and node 132 is coupled to the primary winding 119, via the dc blocking capacitor 134. Due to the current inertia characteristics of the inductor 130 the voltage at node 131 is now negative with respect to the node 132. Hence, current flow in the windings 118 and 119 is directed so that the voltage at the polarity dot of each winding 118 and 119 is positive. The voltage of the secondary winding 121 is also positive at its polarity dot and hence, this voltage forward biases the diode 135 and the voltage of the winding 121 is applied to the output terminals 141 and 142.

The transformer 120 includes a substantial amount of leakage inductance and when the inductor 130 is connected to the windings 118 and 119 to deliver energy thereto the current inertia characteristic of this leakage inductance prevents an immediate current flow from the inductor 130 to the windings 118 and 119. Ordinarily this leakage inductance inertia characteristic would cause a large voltage spike to occur across the two FET power switches 115 and 117 at the on-to-off switching transition. This voltage stress occurring at a high frequency rate requires the use of expensive high voltage power switches.

Two circuit paths, each including a steering diode (diode 144 and 145, respectively) are provided to couple these leakage inductance generated voltage spikes to the transient voltage sink capacitor 112, respectively. The first path including diode 144 connects the node 132 to node 113. Diode 145 of the second path connects node 116 to the node 131. Node 116 is in turn connected to lead 109 which is connected to the grounded plate of the sink capacitor 112. When the two FET switches 115 and 117 are biased into a non-conducting state, the inductor immediately reverses its voltage polarity as it attempts to maintain its current flow. Node 132 is at this instant positive with respect to the node 131. Due to the leakage inductance of the primary windings of transformer 120 the current of inductor 130 can not immediately flow in a path including the primary windings 118 and 119. Diode 144 is forward biased by the positive voltage of the node 132. The positive current output of the inductor 130 at node 132 is transmitted by the diode 144 to the transient voltage sink capacitor 112. The voltage of node 131 is now negative with respect to the ground voltage of node 116 thereby forward biasing the diode 145, and hence, a current flow is enabled from the node 116 to node 131. Thus, the immediate inertia current output of the inductor 130 is absorbed through the diodes 144 and 145 applied to the transient voltage sink capacitor 112. Hence, the voltage stress across the FET switches 115 and 117 is significantly reduced. This current flow is of momentary duration until the current begins to flow through the primary windings 118 and 119 as soon as the initial blocking effect of the leakage inductance is dissipated.

Figure 2:
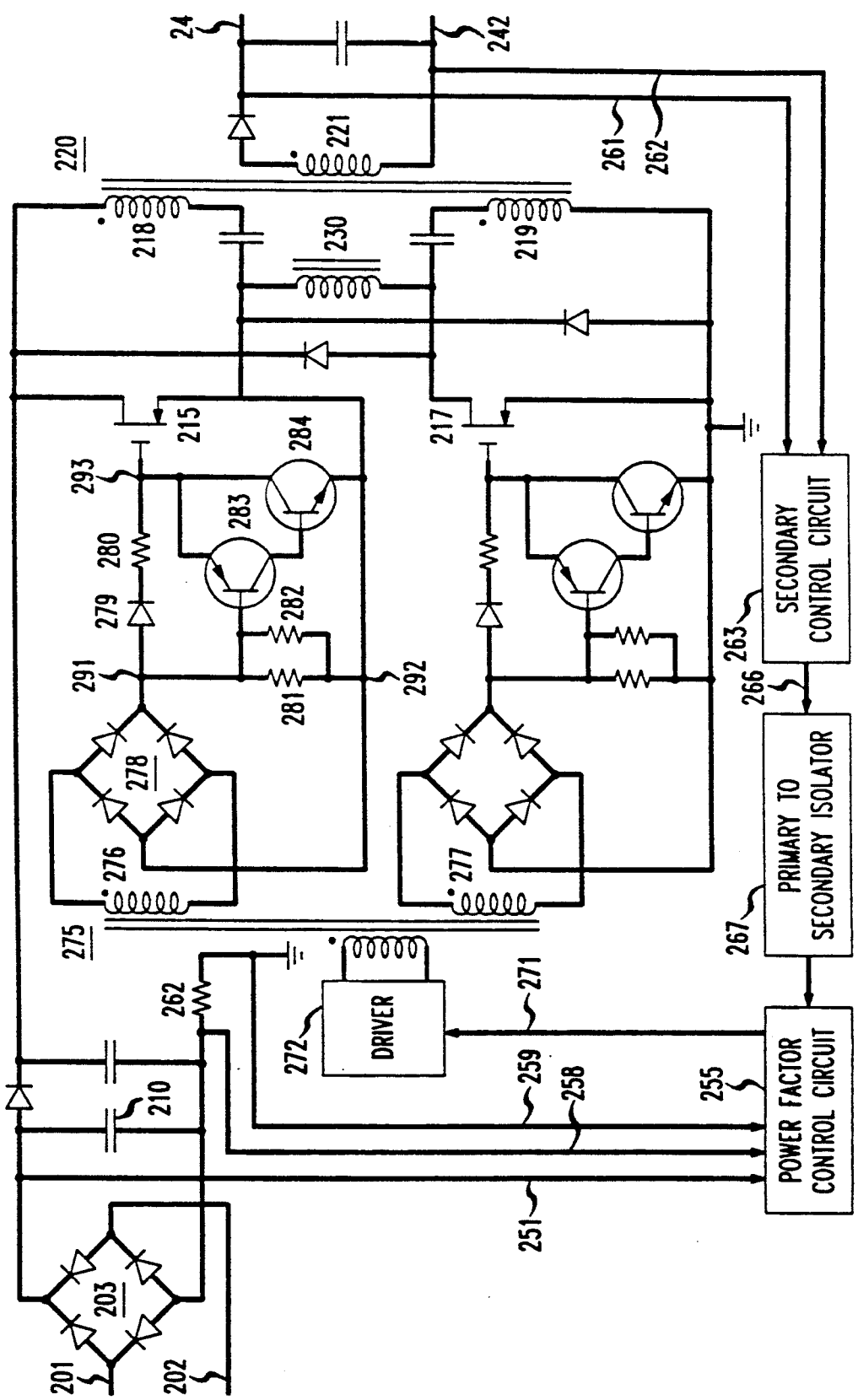
FIG. 2 is a schematic of the OLS of FIG. 1 including the control circuitry controlling operation of the circuitry.

A schematic of the power converter including the regulation and control circuitry is shown in FIG. 2. The AC line power is applied to the input terminals 201 and 202 and rectified by the full wave rectifier 203. The rectified voltage is stored on the voltage storage capacitor 210 and is periodically coupled to the energy storage inductor 230 by the conducting FET power switches 215 and 217, as described above with respect to the circuit of FIG. 1. The energy stored in the energy storage inductor 230 is delivered to the first and second primary windings 218 and 219 of the transformer 220 while the FET power switches 215 and 217 are non-conducting. Output power is derived from the secondary winding 221 and coupled to a load by output terminals 241 and 242.

Feedback circuitry monitors the output voltage and power factor control circuitry monitors the voltage and current waveforms of the unipolar voltage output of the full-wave rectifier 203. The waveform of the voltage stored on the voltage storage capacitor is monitored, via a sensing lead 251 connected to the output of the rectifier 203. Two sensing leads 258 and 259 are connected to sense a voltage due to current flow in a resistor 262 in the return lead connected to the full-wave rectifier 203. These sensing leads are all connected to a power factor control circuit 255 which responds to the above sensed signals and an error signal supplied from the converter secondary to generate a pulse width modulated drive signal for the power switches that optimizes power factor at the input by controlling a current waveform in inductor 230 and additionally regulates the output voltage. A suitable unit for the power factor controller 255 is the commercially available integrated circuit designated as the UC1854 which is available from Unitrode.

The output voltage of the power converter is sensed, via the sensing leads 261 and 262. This sensed output voltage is connected to the secondary control circuit 263. Here it is compared with a reference voltage and an error voltage proportional to a deviation of the output voltage from a desired regulated value is generated. This error voltage is coupled, via lead 266, to the primary to secondary isolator 267, which couples it to the power factor control circuit 255. The isolator 267 may comprise a signal transformer, an opto-isolator or some other suitable equivalent device.

The power factor controller 255 multiplies the sensed rectifier input voltage on lead 251, derived from the input line voltage, with the error voltage derived from the output voltage and compares it to the voltage across leads 258 and 259 of the line current through the resistor 262. The resultant output of the power factor controller is a form of modulated drive pulses at a frequency greatly in excess of the AC line frequency. These drive pulses determine the switching frequency and duty cycle of the two FET power switches 215 and 217.

These modulated pulses supplied by the power factor control circuit 255 are applied, via lead 271, to a driver circuit 272. The output of the driver circuit 272 is a bipolar modulated drive pulse, whose pulse duration is modulated in response to the power factor control circuit 252. It is connected to the primary winding 273 of the drive transformer 275. Transformer 275 includes two secondary windings 276 and 277 each connected to a bias circuit coupled to drive one of the FET switch devices 215 and 217.

The bias circuits for FET switch 215 and 217 are identical hence, only the bias circuit for switch 215 is discussed. The bipolar pulse output of the secondary winding 276 is rectified by the full-wave rectifier 278 producing a unipolar drive pulse having a pulse voltage such that node 291 is positive with respect to node 292. This rectified pulse signal is coupled via the diode 279 and resistor 280 to the node 293 common to the gate electrode of the FET switch 215 and to the emitter of transistor 283 and the collector of transistor 284. As long as the node 291 is positive with respect to node 292, the two transistors 283 and 284 are biased non-conducting. At the end of the pulse when the FET switch is to be turned off the node 291 falls in voltage with respect to the voltage of node 292 and the transistors 283 and 284 are biased conducting. The conducting transistors 283 and 284 drain the voltage of the gate capacitance of FET 215 forcing it to turn off.

Figure 3:
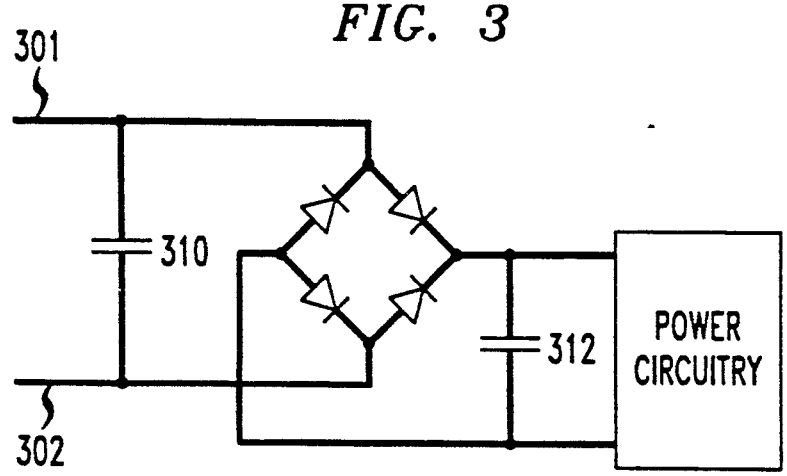
FIGS. 3 and 4 show alternative arrangements of the power input circuitry for the power circuitry of FIGS. 2 and 3.
Figure 4:
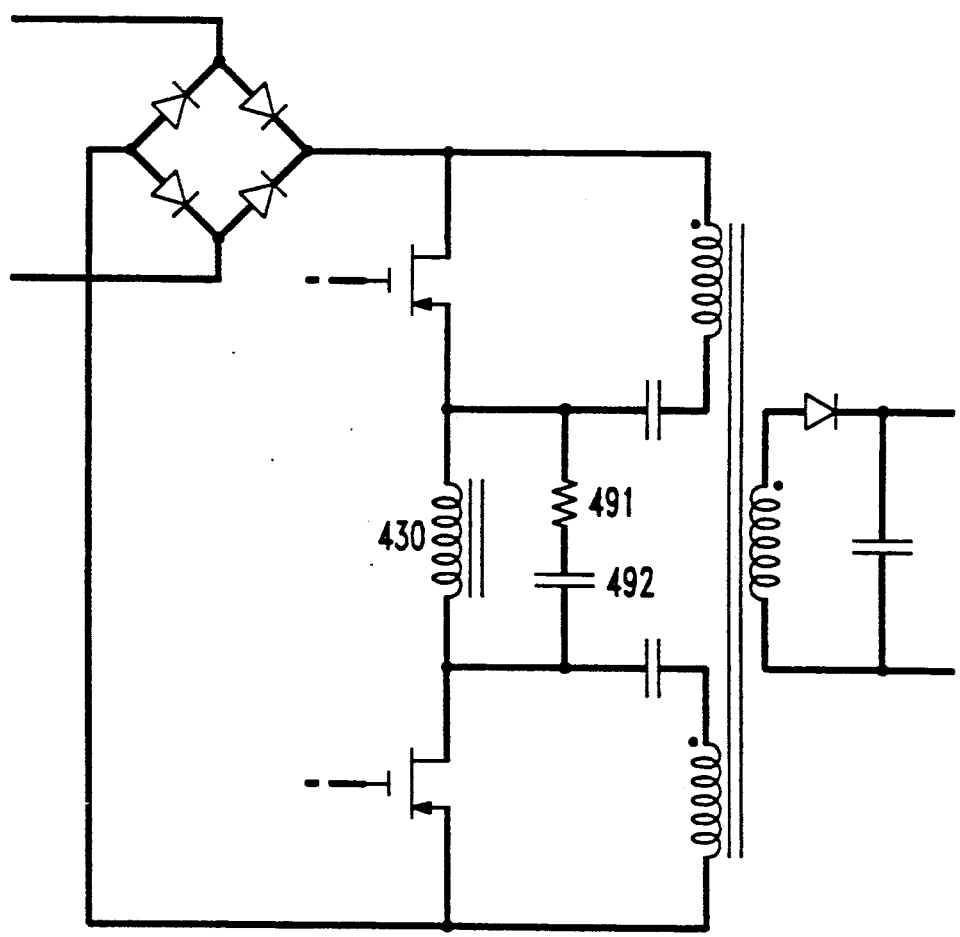

Different variations of the input circuitry of the converter are shown in the FIGS. 3, and 4 In the variation of FIG. 3 the high pass filter capacitor 310 is connected across the input leads 301 and 302. No added dioded is necessary to separate the capacitor 310 and 312. In another variation an RC circuit comprising series connected resistor 491 and capacitor 492 is connected across the energy storage inductor 430. This particular variation permits the elimination of the two diodes 144 and 145 and the transient sink capacitor 112 shown in FIG. 1.

While a particular illustrative embodiment of the invention has been disclosed herein many variations may be devised by those skilled in the art without departing from the spirit and scope of the invention.

We claim:

1. A power converter adapted to be energized by an AC line voltage source;
comprising:
means for accepting the AC line voltage and supplying a unipolar voltage derived from the AC line voltage;
a voltage transient sink capacitor;
an output circuit for coupling energy to a load and including a transformer having first and second primary windings each having an inductive impedance at its energy receiving input;
an energy storage inductance;
first and second power switches connected to opposite terminals of the inductor, and each connected substantially in parallel with the first and second primary windings respectively and operative when in a conducting mode to complete a continuous current path including the voltage storage capacitor and the energy storage inductance;
first and second unidirectional conduction paths operative when the first and second power switches are in a non-conducting mode to connect the energy storage inductance to the voltage transient sink capacitor.

2. A power converter energized from an AC line source,
comprising:
an input for receiving energy from the AC line source;
a rectifier connected to the input;
a filter capacitor connected to be charged by an output of the rectifier;
a voltage transient sink capacitor and isolated from the voltage storage capacitor by an isolating diode;
an energy storage inductor;
a power transformer including first and second primary windings and a secondary winding;
an output circuit connected to the power transformer;
switching circuitry including a first and a second power switching device connected to opposite terminals of and in series circuit with the energy storage inductor, the first power switching device being connected to the first primary winding and the second power switching device being connected to the second primary winding;
The series circuit connected in parallel with the voltage transient sink capacitor;
a switching circuitry control for forming alternate switching circuitry connections operative for alternately connecting the power converter in alternate modes of operation, in which a first mode connection is enabled by simultaneous conduction of the first and second switching devices to enable energy flow from the filter capacitor through the isolating diode to the energy storage inductor while disconnecting the energy storage inductor from the power transformer and in which a second mode connection alternative to the first mode connection mode connection is enabled by simultaneous non-conduction of the first and second switching devices to enable a flow of energy stored in the energy storage inductor to the first and second primary windings of the power transformer; and
at least a unidirectional current conduction path enabled during the second mode connection for coupling initial voltage transients caused by the second mode connection to the voltage transient sink capacitor; and
the switching control circuitry including switch drive circuitry for driving switching devices of the switching circuitry with a modulation scheme to control a current waveform of current in the energy storage inductor to have a waveform that enhances a power factor at the input.

3. A power converter, comprising:
an input connected to receive energy from an AC line;
a rectifier for converting an AC voltage at the input to a unipolar voltage with a half sinusoid waveform envelope;
a filter capacitor connected to store a voltage in response to the unipolar voltage with half sinusoid envelopes;
an energy storage inductor;
a power transformer including a first and second primary winding each having a leakage inductance;

an output circuit connected to the power transformer and having output means to accept a load to be energized;

switching circuitry including a first and second power switch connected to opposite terminals of the energy storage inductor and both first and second power switches being switched simultaneously conducting for periodically alternately connecting the inductor to enable energy delivery from the filter capacitor to the energy storage inductor while disabling energy input from the energy storage inductor to the power transformer and both first and second power switches being subsequently switched simultaneously non-conducting for connecting the energy storage inductor to deliver energy stored in the energy storage inductor to the power transformer;

energy absorbing means connected, via a unidirectional conduction device biased operative by a voltage of the energy storage inductor at a transition from the conducting to non-conduction state of the first and second switching devices, to absorb voltage spikes occurring when the energy storage inductor is connected to the leakage inductance of the first and second primary windings of the power transformer in connecting the energy storage inductor to deliver energy stored in the energy storage inductor to the first and second primary windings power transformer.

4. A power converter, comprising:

an input connected to receive energy from an AC line;

a rectifier for converting an AC voltage at the input to a unipolar voltage with a half sinusoid waveform envelope;

a filter capacitor connected to block transmission of high frequency signals into the AC line;

an energy storage inductor;

a power transformer including a first and second primary winding each having a leakage inductance;

an output circuit connected to the power transformer and having output means to accept a load to be energized;

switching circuitry including a first and second power switch connected to opposite terminals of the energy storage inductor and both first and second power switches being switched simultaneously conducting for periodically alternately connecting the inductor to enable energy delivery from the rectifier to the energy storage inductor while disabling energy input from the energy storage inductor to the power transformer and both first and second power switches being subsequently switched simultaneously non-conducting for connecting the energy storage inductor to deliver energy stored in the energy storage inductor to the power transformer;

energy absorbing means connected, via a unidirectional conduction device biased operative by a voltage of the energy storage inductor at a transition from the conducting to non-conduction state of the first and second switching devices, to absorb voltage spikes occurring when the energy storage inductor is connected to the leakage inductance of the first and second primary windings of the power transformer in connecting the energy storage inductor to deliver energy stored in the energy storage inductor to the first and second primary windings power transformer.

5. A power processing circuit coupled to be energized by a source of AC line voltage;

comprising:

a voltage transient sink capacitor;

input rectifying circuitry connected to the AC line voltage and supplying a unipolar voltage therefrom;

an energy storage inductor having a first and second terminal;

an output circuit including a transformer having first and second primary windings with leakage inductance and a secondary winding connected to means for accepting a load;

a switching circuit including a first power switch connected to the first terminal of the energy storage inductor and a second power switch connected to the second terminal of the energy storage inductor;

switching drive circuitry periodically operated to alternately first bias the first and second power switch conducting to connect the unipolar voltage to the inductor to enable application of energy to the inductor while disconnecting the energy storage inductor from the output circuit, and second bias the first and second power switches non-conducting to alternatively connect the energy storage inductor to the transformer of the output circuit;

unidirectional conducting paths connecting the energy storage inductor to the voltage transient sink capacitor for absorbing voltage spikes resulting from connecting the energy storage inductor to the leakage inductance of the transformer with the voltage of the energy storage inductor enabling the unidirectional conduction path when the first and second power switches are non-conducting.

6. A power converter adapted to be energized by an AC line voltage source;

comprising:

a filter capacitor;

means for accepting the AC line voltage and supplying a unipolar voltage derived from the AC line voltage to the filter capacitor;

means for monitoring a voltage waveform of the unipolar voltage;

a voltage transient sink capacitor;

an output circuit for coupling energy to a load and including a transformer having first and second primary windings each having an inductive impedance at its energy receiving input;

means for comparing a voltage of the output circuit with a reference voltage and generating an error voltage responsive to a difference between the voltage of the output circuit and the reference voltage;

an energy storage inductance;

first and second power switches connected to opposite terminals of the inductor, and connected substantially in parallel with the first and second primary windings respectively and operative when in a conducting mode to complete a continuous current path including the unipolar voltage and the energy storage inductance;

first and second unidirectional conduction paths operative when the first and second power switches are in a non-conducting mode to connect the energy storage inductance to the voltage transient sink capacitor;

pulse generation means responsive to the means for monitoring and the means for comparing for generation a modulated pulse at a frequency substantially in excess of a frequency of the AC line voltage and including pulse modulation coded information to control a current waveform of the energy storage inductor to substantially resemble the voltage waveform of the unipolar voltage and control a voltage of the output circuit to minimize the error voltage; and switch drive circuitry responsive to the pulse generation means to drive the first and second power switches.

7. A power converter adapted to be powered off of an AC line voltage source in which current flow through an energy storage inductor included in the power converter is modulated so that a waveform of current in the inductor has a half cycle fundamental frequency substantially equaling a half cycle fundamental frequency of the AC line voltage source; comprising;

an output circuit with inductive impedance and means for accepting a load to be energized;

a voltage transient sink capacitor having charge storage capacity sufficient for absorbing voltage spike energy and insufficient charge storage capacity for operably storing a sufficient charge to equal a voltage of the voltage storage capacitor;

first voltage monitoring means for sensing a voltage waveform of the rectified voltage, second voltage monitoring means for sensing a voltage magnitude of a voltage of the output circuit;

switching circuitry including first and second power switches connected to opposite ends of the energy storage inductor and operative for modulating the current flow through the energy storage inductor by first alternately coupling the unipolar voltage to the energy storage inductor when both the first and second power switches are conducting and second in the alternative when both the first and second power switches are non-conducting simultaneously coupling the inductor to the output circuit to energize a load and to the voltage transient sink capacitor to absorb voltage spikes generated by the coupling of the energy storage inductor to the inductive impedance; and switch drive circuitry responsive to first and second voltage monitoring means for controlling a current waveform of the energy storage inductor to resemble a waveform of an regulate a voltage applied to the load.

8. A power converter, comprising:
an input source of energy;
an energy storage inductor;
a power transformer including a first and second primary winding each having a leakage inductance;
an output circuit connected to the power transformer and having output means to accept a load to be energized;
switching circuitry including a first and second power switch connected to opposite terminals of the energy storage inductor the first power switch being connected in closed loop with a first DC blocking capacitor and the first primary winding and the second power switch being connected in closed loop with a second DC blocking capacitor and the second primary winding, and a first switched connection in which both first and second power switches are first switched simultaneously conducting for periodically alternately connecting the inductor to enable energy delivery from the rectifier to the energy storage inductor, while disabling energy input from the energy storage inductor to the power transformer a second switched connection alternative to the first switched connection in which both first and second power switches are subsequently and secondly switched simultaneously non-conducting for connecting the energy storage inductor to deliver energy stored in the energy storage inductor to the power transformer;

energy absorbing means connected to the energy storage inductor, via a unidirectional conduction device biased operative by a voltage of the energy storage inductor at a transition from the conducting to non-conduction state of the first and second switching devices, to absorb energy spikes occurring when the energy storage inductor is connected to the leakage inductance of the first and second primary windings of the power transformer in connecting the energy storage inductor to deliver energy stored in the energy storage inductor to the first and second primary windings power transformer.

9. A power converter adapted to be powered off of an AC line voltage source in which current flow through an energy storage inductor included in the power converter is modulated so that a waveform of current in the inductor has a half cycle fundamental frequency substantially equaling a half cycle fundamental frequency of the AC line voltage source; comprising;

an output circuit with inductive impedance and means for accepting a load to be energized;

a voltage transient sink capacitor having charge storage capacity sufficient for absorbing voltage spike energy and insufficient charge storage capacity for operably storing a sufficient charge to equal a voltage of the voltage storage capacitor;

first voltage monitoring means for sensing a voltage waveform of the rectified voltage, second voltage monitoring means for sensing a voltage magnitude of a voltage of the output circuit;

switching circuitry including a first and second power switch connected to opposite terminals of the energy storage inductor the first power switch being connected in closed loop with a first DC blocking capacitor and the first primary winding and the second power switch being connected in closed loop with a second DC blocking capacitor and the second primary winding, and a first switched connection in which both first and second power switches are first switched simultaneously conducting for periodically alternately connecting the inductor to enable energy delivery from the rectifier to the energy storage inductor, while disabling energy input from the energy storage inductor to the power transformer a second switched connection alternative to the first switched connection in which both first and second power switches are subsequently and secondly switched simultaneously non-conducting for connecting the energy storage inductor to deliver energy stored in the energy storage inductor to the power transformer;

energy absorbing means connected to the energy storage inductor, via a unidirectional conduction device biased operative by a voltage of the energy storage inductor at a transition from the conducting to non-conduction state of the first and second switching devices, to absorb energy spikes occurring when the energy storage inductor is connected to the leakage inductance of the first and second primary windings of the power transformer in connecting the energy storage inductor to deliver energy stored in the energy storage inductor to the first and second primary windings power transformer; and switch drive circuitry responsive to first and second voltage monitoring means for controlling a duty cycle of the first and second power switches in order to control a current waveform of the energy storage inductor to resemble a waveform of and to regulate a voltage applied to the load.

* * * * *